(12) United States Patent
Iwai (10) Patent No.: US 7,227,676 B2
(45) Date of Patent: Jun. 5, 2007

(54) OPTICAL SCANNING APPARATUS

(75) Inventor: Hitoshi Iwai, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/511,348

(22) Filed: Aug. 29, 2006

(65) Prior Publication Data

US 2007/0053036 A1 Mar. 8, 2007

(30) Foreign Application Priority Data

Sep. 6, 2005 (JP) .............................. 2005-257720

(51) Int. Cl.
*G02B 26/08* (2006.01)
*G03G 15/22* (2006.01)

(52) U.S. Cl. ...................... 359/201; 359/204; 359/216; 399/151

(58) Field of Classification Search ................ None
See application file for complete search history.

(56) References Cited

U.S. PATENT DOCUMENTS 6,013,406 A * 1/2000 Moriki et al. .......... 430/108.22

6,819,902 B2 * 11/2004 Toyohara et al. ........... 399/298

FOREIGN PATENT DOCUMENTS

JP 9-104132 4/1997

* cited by examiner

*Primary Examiner*—James Phan
(74) *Attorney, Agent, or Firm*—Fitzpatrick, Cella, Harper & Scinto (57) ABSTRACT

To provide an image forming apparatus including a plurality of laser scanning units having deflecting and scanning means which deflect and scan light fluxes emitted from a plurality of light sources, respectively; a plurality of image bearing members on which electrostatic latent images are formed by scanning the light fluxes by means of the deflecting and scanning means; and a plurality of development units which develops the electrostatic latent image formed on each of the plurality of image bearing members with toners of colors with different brightness; wherein the rotational phases of the plurality of deflecting and scanning means are controlled, respectively, based on the light flux for scanning an image bearing member on which a toner image of which color has a lower brightness among a plurality of image bearing members which is scanned by the deflecting and scanning means is formed.

7 Claims, 5 Drawing Sheets

|     | L*   |
| --- | ---- |
| K   | 20.2 |
| C   | 49.5 |
| M   | 51.0 |
| LC  | 68.7 |
| LM  | 71.8 |
| Y   | 88.0 |

OPTICAL SCANNING APPARATUS

BACKGROUND OF THE INVENTION

1. Field of the Invention

The present invention relates to an optical scanning apparatus such as a laser beam printer constructing an output part of a copy machine, a facsimile, and a computer or the like.

2. Description of the Related Art

In a copy machine and a printer for scanning a laser beam by a rotary polygon mirror which is a rotary polyhedral mirror and forming a color image, an electrostatic latent image is formed on a photosensitive drum for each color by the laser beam and the electrostatic latent images are developed by a plurality of development units for each color. Then, toner images made of a single color such as Yellow (hereinafter, abbreviated as Y), Magenta (hereinafter, abbreviated as M), Cyan (hereinafter, abbreviated as C), and Black (hereinafter, abbreviated as K) are formed. Then, transferring them on an intermediate transfer member and superimposing them, respectively, a color image is formed.

Figure 5:
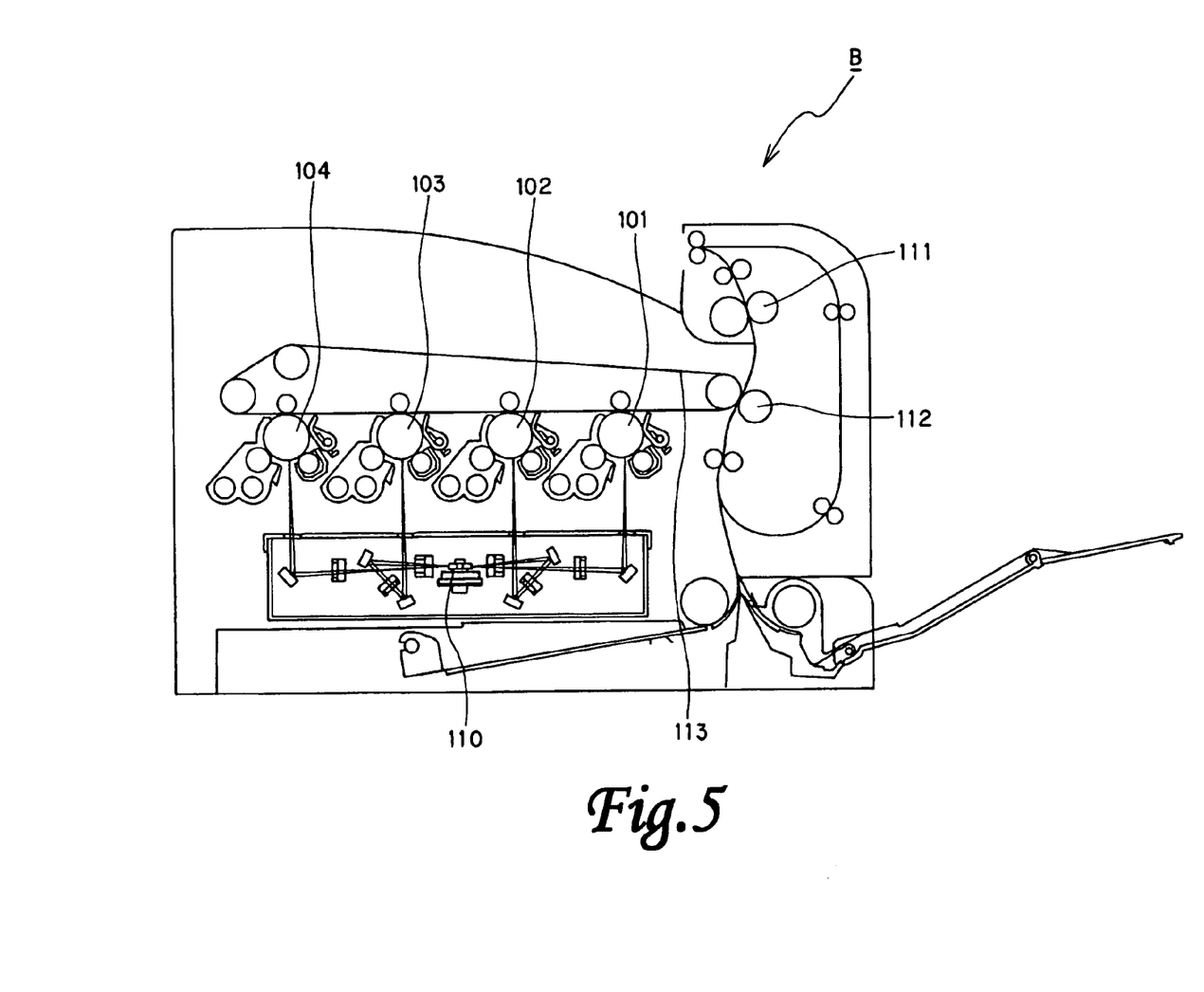
FIG. 5 is a cross sectional view of an image forming apparatus according to a related art.

Next, this will be briefly described with reference to FIG. 5. Reference numerals 101 to 104 denote drum units for forming color toner images of Y, M, C, and K on photosensitive drums, respectively. The toner image formed on each photosensitive drum is superimposed on a transfer belt 113 which is an intermediate transfer member. Then, an unfixed toner image is transferred on a recording material by transcription means, and the toner image is fixed on the recording material due to heat by fixing means.

As such a color image forming apparatus, there are two types, namely, a single drum system for forming a toner image on a single photosensitive drum more than once and a so-called tandem drum system for arranging a plurality of photosensitive drums corresponding to each color and transferring the toner images collectively on a recording paper or the intermediate transfer member.

In any type of color image forming apparatuses, unless a print position of each color such as Y, M, C, and K is correctly aligned with the recording paper, color shading or the like due to color drift is generated so as to significantly degrade an image quality.

There are various causes of color drift, however, limiting the cause to the color drift of exposure due to a laser scanning apparatus, deviation of an irradiation position due to variation of an ambient temperature and deviation of a writing position in a sub-scanning direction (a recording paper feeding direction) due to curvature; of a scanning line and dispersion of a rotational phase of a rotary polygon mirror or the like may be considered.

As an art to decrease these color drifts of exposure, a method for correcting color drift by sequentially measuring the deviation of the irradiation position and the deviation due to curvature of the scanning line when the apparatus is operating, and moving or rotating a lens and a mirror in accordance with the deviation amount has been known. In addition, with respect to the color drift due to dispersion of the rotational phase of the rotary polygon mirror, various suggestions are made to control the rotational phase by adjusting a rotation speed of the rotary polygon mirror under PLL (Phase Locked Loop) control.

In Japanese Patent Application Laid-Open No. 9-104132, the mechanism for suppressing the phase deviation within a range of a predetermined value by recognizing the deviation of the phase with respect to the writing position from a signal synchronization signal of a main body of an image forming apparatus and a BD signal of a laser scanning apparatus and varying a frequency of a reference signal in accordance with the deviation is disclosed.

Thus, according to the art for preventing the color drift due to the rotational phase of the rotary polygon mirror, an image forming apparatus for scanning one laser beam for each rotary polygon mirror is more advantageous because the rotational phases of the rotary polygon mirror can be adjusted among respective lasers and the color drift can be suppressed within several microns on the recording paper. The same applies to the single drum system or the tandem drum system if one rotary polygon mirror is rotated with respect to one laser.

However, in the image forming apparatus in recent years, speeding up of the image output has been required, so that the above-described tandem drum system is becoming a mainstream. In addition, miniaturization and price reduction of the apparatus has been also strongly required and it is preferable that the laser scanning apparatus is not provided for each photosensitive drum in the tandem system. Therefore, as shown in FIG. 5, an image forming apparatus B configured as an all-in-one mechanism for scanning all photosensitive drums 101 to 104 by one rotary polygon mirror 110 has been also devised.

In such a laser scanning apparatus of the all-in-one mechanism, entering a plurality of laser beams in the rotary polygon mirror, each laser beam is scanned on the different photosensitive drum, so that it is not possible to match the rotational phases of the rotary polygon mirror among respective colors in principle.

As a result, the deviation caused by the phase of the rotary polygon mirror has been generated relatively within one scanning line at the maximum among respective laser beams. One scanning line is about 42 µm when a sub-scanning resolution is 600 dpi. Since the rough standard of the color drift which is allowed on the recording paper is about 100 µm, this is not an amount which can be ignored.

Therefore, according to the mechanism such that a plurality of laser scanning apparatuses for irradiating a plurality of laser beams is provided, the color drift can be decreased.

According to such a mechanism, in each laser scanning apparatus, it is possible to improve a scanning accuracy of the laser beam which is the standard of the rotational phase of the rotary polygon mirror. However, if the standard of the rotational phase of the rotary polygon mirror is made into the laser beam for forming a toner image with indistinctive brightness on the image in a plurality of laser scanning apparatuses, the scanning accuracy of the laser beam for forming a toner image with the low brightness which is highly visible oh the image is made lower. As a result, the color drift is highly visible on the image.

Accordingly, when providing a plurality of laser scanning apparatuses, it is preferable that the laser beam having major impact on the image is defined as the standard of control of the rotational phase of the rotary polyhedral mirror.

SUMMARY OF THE INVENTION

Therefore, an object of the present invention is to provide an optical scanning apparatus capable of decreasing a color drift which is highly visible on an image even if a plurality of laser scanning apparatuses for irradiating a plurality of lasers is provided. In addition, other object of the present invention will be apparent by the following description.

The present invention thus provides
an optical scanning apparatus, comprising:
a first laser scanning unit having a first rotary polyhedral mirror which deflects and scans a first laser beam exposing a first image bearing member and a second laser beam exposing a second image bearing member;
a second laser scanning unit having a second rotary polyhedral mirror which deflects and scans a third laser beam exposing a third image bearing member and a fourth laser beam exposing a fourth image bearing member; and
control means which controls the rotational phase of the first rotary polyhedral mirror based on a laser beam irradiated to an image bearing member of which brightness is lower than the brightness of the toner that is developed on the first image bearing member and the brightness of the toner that is developed on the second image bearing member; and controls the rotational phase of the second rotary polyhedral mirror based on a laser beam irradiated to an image bearing member of which brightness is lower than the brightness of the toner that is developed on the third image bearing member and the brightness of the toner that is developed on the fourth image bearing member on the basis of said rotational phase which is controlled.

BRIEF DESCRIPTION OF THE DRAWINGS

The invention, together with further advantages thereof, may best be understood by reference to the following description taken in conjunction with the accompanying drawings in which.

DESCRIPTION OF THE PREFERRED EMBODIMENTS

With reference to the drawings and the embodiments, the best mode for carrying out the invention will be described by way of illustration in detail below. However, the scope of the present invention is not only limited to the measurement, the material, the shape, and its relative position or the like of the components described in this embodiment unless otherwise specified. In addition, in the following descriptions, the material and the shape or the like of the members which have been described once are the same as those which are initially described unless otherwise specified.

(Image Forming Apparatus)

Figure 1:
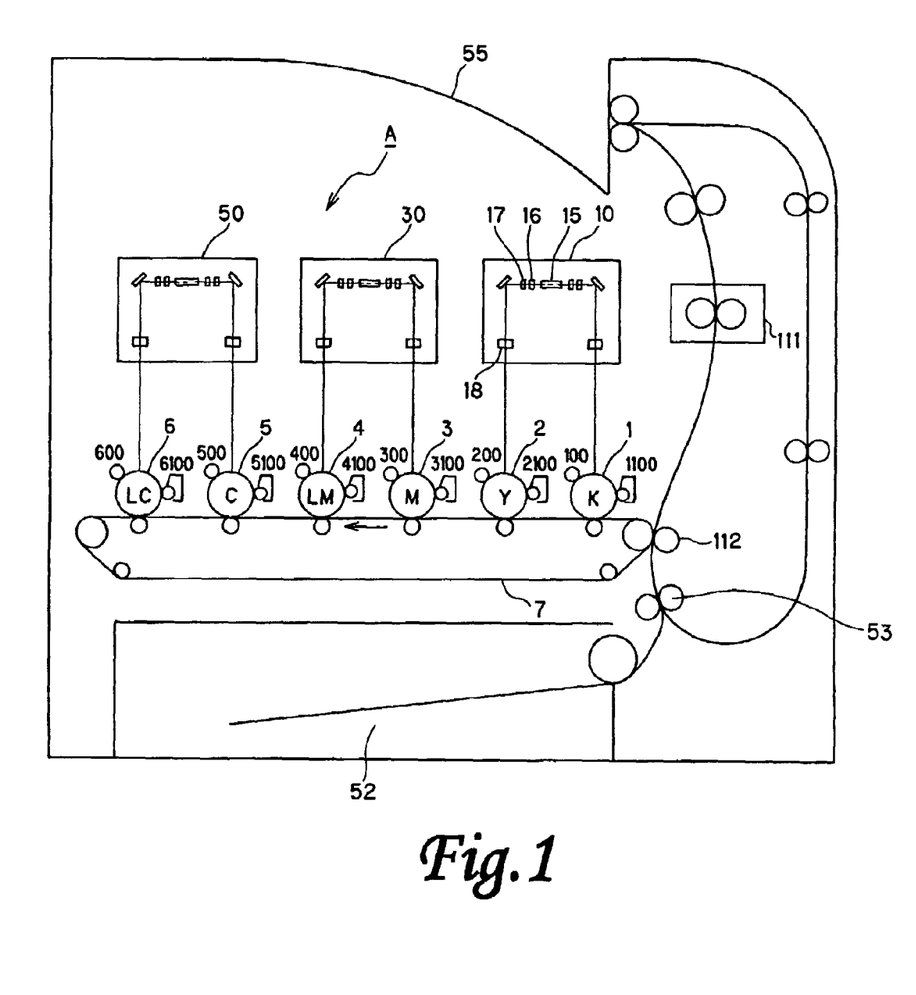
FIG. 1 is a pattern cross sectional view showing a schematic structure of an image forming apparatus according to the present invention.

FIG. 1 is a pattern cross sectional view showing a schematic structure of an image forming apparatus according to the present invention. An image forming apparatus A according to the present embodiment is shown in FIG. 1. In order to form toner images of six colors, namely, Yellow (Y), Magenta (M), Cyan (C), Black (K), Light Magenta (LM), and Light Cyan (LC), photosensitive drums 1 to 6 as an image bearing member are disposed. Here, Light Magenta is a color having the same color phase as Magenta and having a higher brightness than Magenta, and Light Cyan is a color having the same color phase as Cyan and having a higher brightness than Cyan.

In addition, there are provided charging rollers 100, 200, 300, 400, 500, and 600 as charging means corresponding to each of six color toner images. In order to expose a charged surface of these photosensitive drums 1 to 6, the image forming apparatus A is provided with laser scanning apparatuses 10, 30, and 50 as an optical scanning apparatus. Then, each laser scanning apparatus may scan two photosensitive drums at the same time by two laser beams (light flux) which are deflected by one rotary polygon mirror (a rotary polyhedral mirror).

The photosensitive drums 1 to 6 are scanned by the laser beam and the electrostatic latent images are formed thereon. Then, the formed electrostatic latent images are developed as toner images with toners of colors with different brightness by means of a plurality of development units (1100, 2100, 3100, 4100, 5100, 6100) corresponding to respective photosensitive drums 1 to 6.

The toner images of each color formed on the photosensitive drums 1 to 6 are sequentially transferred on an intermediate transfer member 7 by each first transfer unit. On a recording material to be conveyed from a cassette 52 under the main body of the apparatus to a second transfer unit in synchronization with formation of an image by a conveyance roller 53 which is conveyance means, the toner images of respective colors are secondarily transferred in block on the recording paper at a second transfer unit 112. It is obvious that the toner image may be directly transferred on the recording paper without using the intermediate transfer member 7. In this case, the toner image is transferred on the recording material by a transfer roller which is second transfer means 112. After that, the toner image is fixed on the recording material by a heat and a pressure by fixing means 111. After being fixed, the recording material is discharged to a discharge unit 55.

(Optical Scanning Apparatus)

Figure 2:
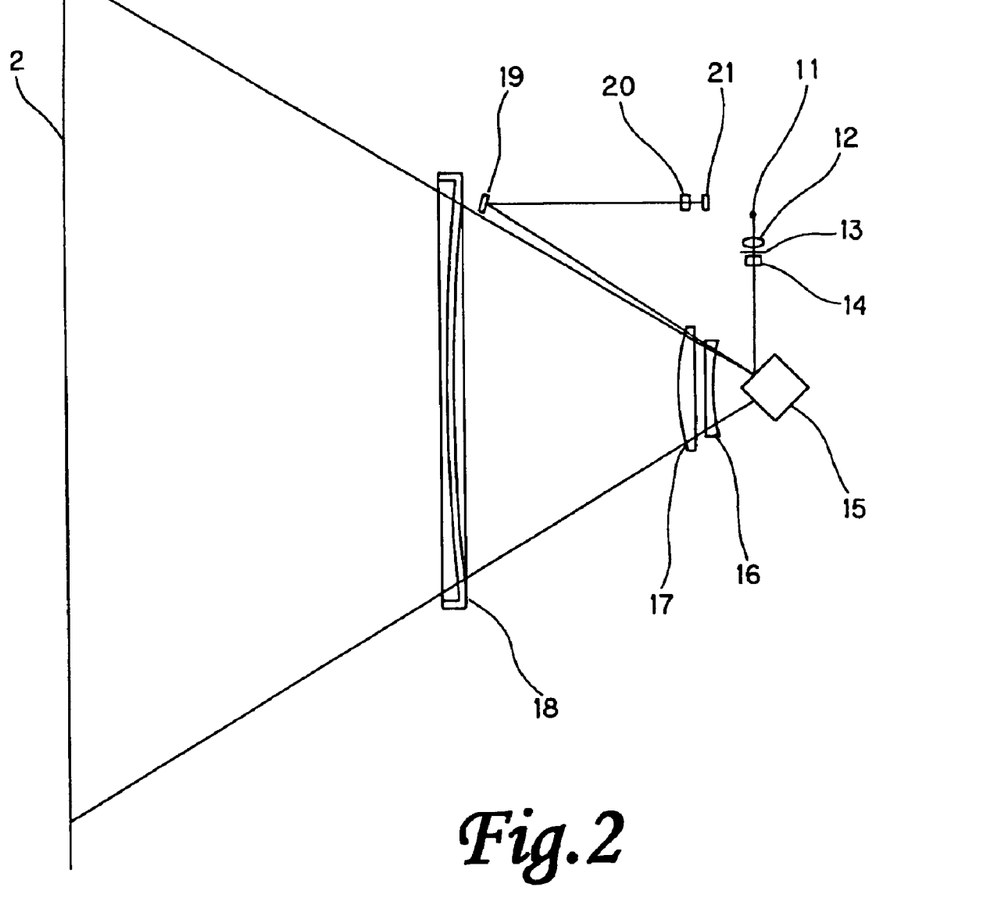
FIG. 2 is a pattern diagram developing a scanning light path in the laser scanning apparatus according to an embodiment of the present invention on a main scanning plane.

Next, the laser scanning apparatus as an example of the optical scanning apparatus will be described below. FIG. 2 is a pattern diagram developing a scanning light path in the laser scanning apparatus 10 on a main scanning plane. Explaining this apparatus along a light path, the light flux emitted from a light source 11 made of a laser diode which is a laser beam luminescence source is transformed to a parallel light flux passing through a collimator lens 12. Then, the parallel light flux is focused on a rotary polygon mirror 15 in the form of a line extended along a main scanning direction by an aperture diaphragm 13 for forming the light flux into a desired shape and a cylindrical lens 14 having a power only in a sub-scanning direction. Further, the light flux which is deflected by the rotary polygon mirror 15 may form an electrostatic latent image in such a manner that the deflected light flux passes through fθ lenses 16, 17 and then, the deflected light flux is focused on the surface of the photosensitive drum 1 in the form of a spot by an imaging lens 18 to be scanned.

In addition, a reflection mirror 19 is disposed outside of a latent image formed area at the upstream of the scanning direction, and guiding the light flux to a BD sensor 21 passing through a BD lens 20, a start point of exposure is synchronized. Further, although the light path at one side in one station is only explained in FIG. 2, another one light path is formed almost being symmetric with the former light path across the rotary polygon mirror in practice. In other words, the rotary polygon mirror 15 may deflect and scan the light fluxes emitted from a plurality of light sources, respectively, and may form electrostatic latent images on a plurality of photosensitive drums corresponding to respective light fluxes.

The laser scanning unit according to this embodiment has optical components such as a plurality of light sources; a rotary polygon mirror for deflecting and scanning the laser beams emitted from the plurality of light sources, respectively; a mirror for irradiating the laser beams to the photosensitive drums on which the toner images with the different brightness are formed, respectively; and a lens.

According to this embodiment, the laser scanning apparatus 10 which is the first scanning unit may scan the laser beams on the photosensitive drums on which a Yellow toner image and a Black toner image are formed, respectively. A first laser beam is irradiated to the photosensitive drum 1 which is a first image bearing member and a second laser beam is irradiated to the photosensitive drum which is a second image bearing member. In addition, the laser scanning unit 30 which is a second scanning unit may scan the lasers on the photosensitive drums on which a strong Magenta toner image and a light Magenta toner image having the same color phase as Magenta and having a different brightness from Magenta are formed, respectively. A third laser beam is irradiated to the photosensitive drum 3 which is a third image bearing member and a fourth laser beam is irradiated to the photosensitive drum 4 which is a fourth image bearing member. In addition, the laser scanning unit 50 which is a third scanning unit may scan the lasers on the photosensitive drums on which a strong Cyan toner image and a light Cyan toner image having the same color phase as Cyan and having a different brightness from Cyan are formed, respectively. A fifth laser beam is irradiated to the photosensitive drum 5 which is a fifth image bearing member and a sixth laser beam is irradiated to the photosensitive drum 6 which is a sixth image bearing member. According to this embodiment, the laser scanning for forming the toner image having the same color phase is carried out in the same unit.

The image forming apparatus according to the present embodiment has first to third laser scanning units, namely, three laser scanning units; however, the present invention can be applied if it has two or more laser scanning units.

(Rotational Phase Control)

Next, with reference to FIG. 3, control of rotational phase by the rotary polygon mirror will be described below. In the image forming apparatus according to the present embodiment, there is provided rotational phase adjusting (controlling) means for adjusting the rotational phases of a plurality of rotary polygon mirrors which is disposed in separate laser scanning units, respectively. Further, in the control of the rotational phase to he described below, respective laser scanning units are controlled with reference to one laser beam among two laser beams to be scanned by one laser scanning unit, and the present rotational phase control is characterized in that on which laser beam the control is based. The explanation will be described below.

Figure 3:
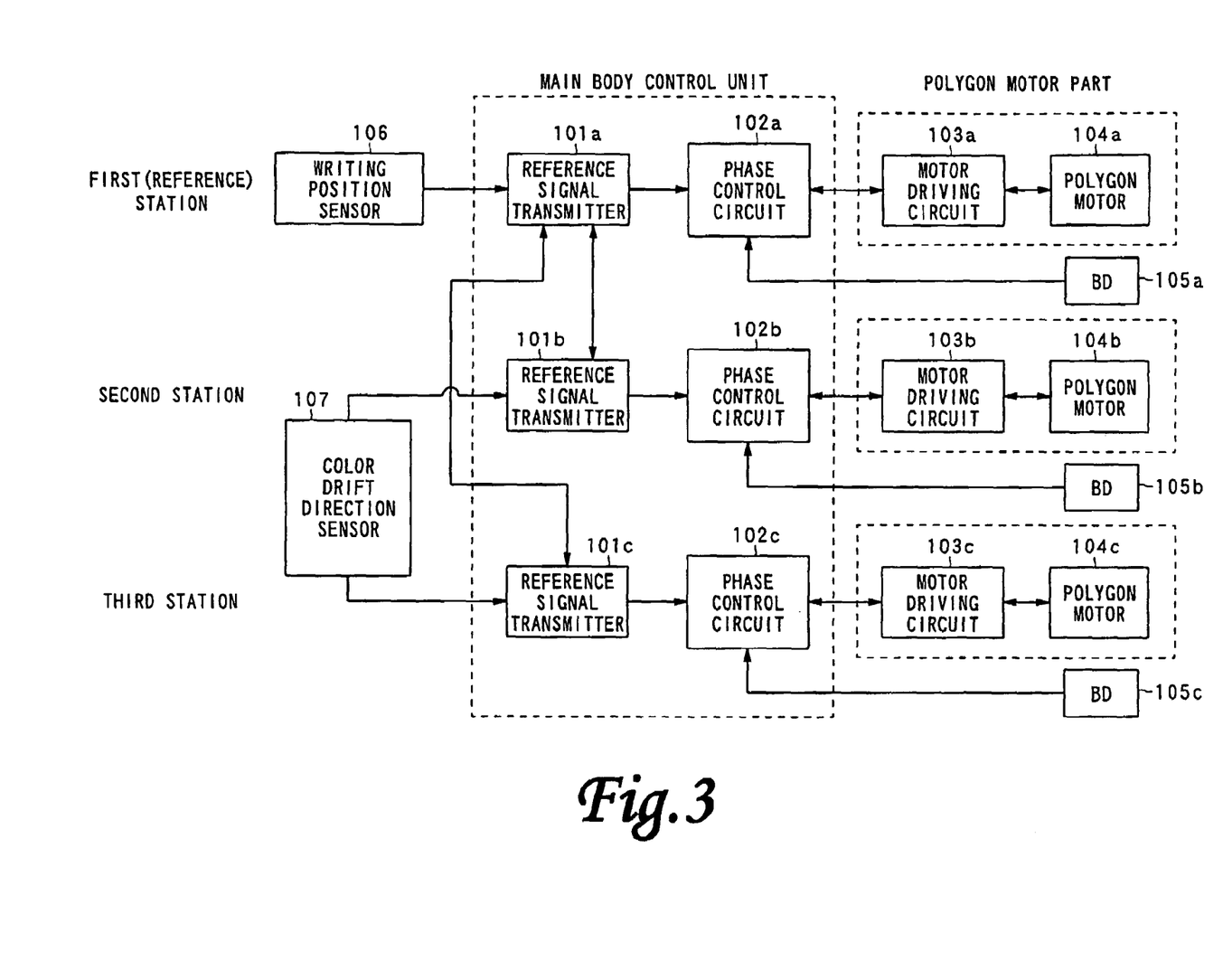
FIG. 3 is a block diagram showing the structure of the laser scanning apparatus according to the embodiment of the present invention.

FIG. 3 is a block diagram showing the structure of the laser scanning apparatus according to this embodiment. The laser scanning apparatuses 10, 30, and 50 are provided in the above-described first to third laser scanning units (hereinafter, referred to as a station), respectively. Among them, the first station is a base station, and in the second and third stations, the phase of the rotary polygon mirror is matched to that of the first station.

At first, using a signal of a writing position sensor 106 which is disposed in the main body of the image forming apparatus as a trigger, a reference signal transmitter 101a of the laser scanning unit which is the basis may generate a reference pulse. A phase control circuit 102a compares this reference pulse with a polygon motor phase signal to be inputted from a motor driving circuit 103a; and the phase control circuit 102a transmits a rotational speed control signal of a polygon motor 104a to the motor driving circuit 103a so as to make the rotational phase of the rotary polygon mirror into a desired value.

The second and third laser scanning units may generate a reference pulse of each station from a color drift amount from the reference station to be given by a color drift detection sensor which is separately disposed to the main body, and then, as same as the reference station, the rotational phases of rotary polygon motors 104b and 104c are matched to a desired value. Further, this reference station is a station which emits a laser beam for exposing the toner image formed by using the toner of a color having the lowest brightness in the image forming apparatus.

In this embodiment, the first laser scanning unit is denoted by 10; the second laser scanning unit is denoted by 30; and the third laser scanning unit is denoted by 50; respectively.

Under these controls, in the laser beam which is the basis among two laser beams to be scanned by each station, the rotational phases of the rotary polygon mirror approximately conform to each other in each station.

Figure 4:
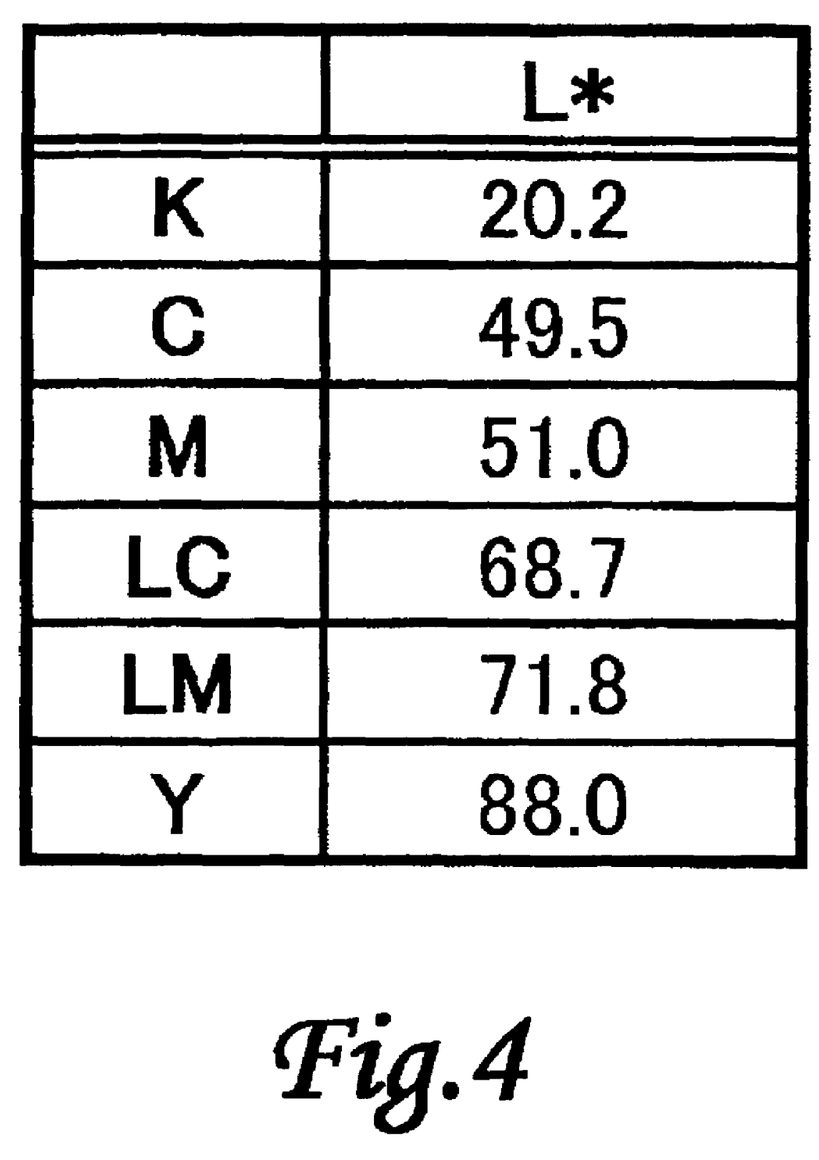
FIG. 4 is a table showing a brightness of each color according to the present embodiment of the present invention.

In this case, FIG. 4 shows which brightness six color toners according to the present embodiment have in a L*a*b* color coordinate system as one uniform color space. In FIG. 4, setting out the six color toners by rotation from one having a lower brightness, this can be shown in the following order.

$$L^*(K) < L^*(C) < L^*(M) < L^*(LC) < L^*(LM) < L^*(Y)$$

Further, the brightness L* of the toner is measured by the following measurement method. Transparence and White have higher brightness than Yellow.

In other words, the brightness L* in the toner in a powder state is measured by using a spectral color difference meter, "SE-2000" (manufactured by Nihon Denshoku Kogyosha) conforming to JIS Z-8722. Measurement is carried out by using a light source C twice in eyesight along the attached manual. However, for meeting the standard of a normal version, it is preferable that measurement is carried out under the state that a glass of a diameter 30 mm and a thickness 2 mm is put in an optional cell for measurement of a powder. For more details, the measurement will be carried out setting the cell in which a sample is filled on a sample table for a powder sample (attachment) of the spectral color difference meter. Before setting the cell on the sample table for a powder sample, filling the. powder sample not less than 80% for the inner volume of the cell and adding vibration per second for 30 seconds on a vibration table, L* will be measured.

It is generally said that the color with the lower brightness can be easily recognized according to a visual feature of a human being. In other words, even if the colors have the same color drift amounts, the color with the lower brightness can be easily recognized as a clear color drift and a user easily feels deterioration of the image quality.

Therefore, in the image forming apparatus according to this embodiment, as shown in FIG. 1, in the case that the process colors are divided into two depending on a brightness, a color is selected from a group of a lower brightness, K, M, and C and a group of a higher brightness, Y, LM, and LC, respectively, to be divided to each station. That is, K and Y are allocated to the first station; M and LM are allocated to the second station; and C and LC are allocated to the third station, respectively. According to this embodiment, the base station is the scanning unit 10 for exposing K.

The rotational phase control of the rotary polygon mirror among the above-described respective stations is carried out on the basis of K, M, and C having low brightness. Thereby, the color drift within one scanning at a maximum may occur in LM, LC, and Y, respectively in principle; however, the color drifts in K, M, and C which can be easily recognized by human eyes are decreased, so that the image quality is not largely lowered when the image is evaluated by senses.

That is, according to the present invention, it is possible to make a color drift among the colors which are highly visible on the image when the color drift is generated smaller. According to this embodiment, there is the even number of colors and they are divided every two to each station; however, the present invention is not always limited to this. In other words, even when there is the odd number of colors such as five colors or seven colors and a station which only performs a single laser scanning is generated, the same advantage can be obtained if the above-described rotary polygon mirror phase control is carried out in the station which performs other plural scanning.

With respect to the present embodiment, the description is given for six color toners; however, the same advantage can be made in the following structure in the case of four color toners. That is to say, it is a method to divide Black and Cyan into a group with a lower brightness and divide Magenta and Yellow into a group with a higher brightness and then, divide these four colors into two laser scanning unit. For example, Black and Yellow are allocated to the first laser scanning unit and Cyan and Magenta are allocated to the second laser scanning unit. Then, the laser beam corresponding to the toner with the lower brightness in each laser scanning unit is made into a basis for control of the rotational phase of the rotary polyhedral mirror.

Next, the case having two laser scanning units and six color toners will be described below.

In other words, the group with the lower brightness has L*(K), L*(C), and L*(M), and the group with the higher brightness has L*(LC), L*(LM), and L*(Y). To the first laser scanning unit, L*(K), L*(C), and L*(Y) are irradiated; and to the second laser scanning unit, L*(M), L*(LC), and L*(LM) are irradiated, respectively. Under such a structure, the laser which is the basis of each rotational phase can decrease a color drift unless its brightness is the highest. Therefore, to the first laser scanning unit, L*(K) or L*(C) may be irradiated, and to the second laser scanning unit, L*(M) or L*(LC) may he irradiated.

Further, in order to decrease the color drift, it is more preferable that the laser beam corresponding to the lowest brightness of the toner, of which toner image is formed by the laser beam to be irradiated from one laser scanning unit, is made into the basis of the rotational phase.

According to the structure of the present invention, there are a color to which the phase of the rotary polygon mirror coincides and a color to which the phase of the rotary polygon mirror does not coincide, so that it is not necessary to provide rotary polygon mirrors for the number of colors with the emphasis on the color drift as a conventional manner. Thereby, even if there is provided a plurality of laser scanning apparatuses for irradiating a plurality of lasers, it is possible to decrease the color drift which is highly visible on the image.

In addition, even if a plurality of photosensitive drums is scanned by one rotary polygon mirror, the color drift is not highly visible compared to the conventional image forming apparatus. As a result, the structure of the apparatus can be simplified and the size of the apparatus can be made smaller. As described above, according to the present invention, even when there is provided a plurality of laser scanning apparatuses for irradiating a plurality of laser beams, it is possible to decrease the color drift which is highly visible on the image.

The embodiment according to the present invention has been described as above; however, the present invention is not limited to the above-described embodiment and various modifications will be possible without departing from the scope and spirit of the present invention.

This application claims priority from Japanese Patent Application No. 2005-257720 filed Sep. 9, 2005, which is hereby incorporated by reference, herein.

What is claimed is:

1. An optical scanning apparatus, comprising:
   a first laser scanning unit having a first rotary polyhedral mirror which deflects and scans a first laser beam exposing a first image bearing member and a second laser beam exposing a second image bearing member;
   a second laser scanning unit having a second rotary polyhedral mirror which deflects and scans a third laser beam exposing a third image bearing member and a fourth laser beam exposing a fourth image bearing member; and
   control means which controls the rotational phase of the first rotary polyhedral mirror based on a laser beam irradiated to an image bearing member of which brightness is lower than the brightness of the toner that is developed on the first image bearing member and the brightness of the toner that is developed on the second image bearing member; and controls the rotational phase of the second rotary polyhedral mirror based on a laser beam irradiated to an image bearing member of which brightness is lower than the brightness of the toner that is developed on the third image bearing member and the brightness of the toner that is developed on the fourth image bearing member on the basis of said rotational phase which is controlled.

2. The optical scanning apparatus according to claim 1, wherein a laser beam which is a basis in the first laser scanning unit and the second laser scanning unit is one which irradiates an image bearing member to be developed by any toner of Black, Magenta, and Cyan.

3. The optical scanning apparatus according to claim 1, having a third laser scanning unit having a third rotary polyhedral mirror which deflects and scans a fifth laser beam exposing a fifth image bearing member and a sixth laser beam exposing a sixth image bearing member;
   wherein said control means controls the rotational phase of the third rotary polyhedral mirror based on a laser beam irradiated to an image bearing member of which brightness is lower than the brightness of the toner that is developed on the fifth image bearing member and the brightness of the toner that is developed on the sixth image bearing member on the basis of said rotational phase which is controlled.

4. The optical scanning apparatus according to claim 3, wherein a laser beam which is a basis in the first laser scanning unit, the second laser scanning unit, and the third laser scanning unit is one which irradiates an image bearing member to be developed by any toner of Black, Magenta, and Cyan.

5. The optical scanning apparatus according to claim 4,
wherein any one from among first to sixth image bearing members is an image bearing member which is developed by a toner having the same color phase as Magenta and having a different brightness from Magenta; and any one from among first to sixth image bearing members is an image bearing member which is developed by a toner having the same color phase as Cyan and having a different brightness from Cyan.

6. The optical scanning apparatus according to claim 1,
wherein the first rotary polyhedral mirror deflects and scans the fifth laser beam exposing the fifth image bearing member and the second rotary polyhedral mirror deflects and scans the sixth laser beam exposing the sixth image bearing member.

7. The optical scanning apparatus according to claim 1,
wherein any one from among first to sixth image bearing members is an image bearing member which is developed by a toner having the same color phase as Magenta and having a different brightness from Magenta; and any one from among first to sixth image bearing members is an image bearing member which is developed by a toner having the same color phase as Cyan and having a different brightness from Cyan.

* * * * *